United States Patent
Ashcraft

[11] Patent Number: 5,785,182
[45] Date of Patent: Jul. 28, 1998

[54] PORTABLE FINISHING SLUICE

[76] Inventor: Clarence W. Ashcraft, R.R. 5, Box 207, Mt. Vernon, (Jefferson County), Ill. 62864

[21] Appl. No.: 582,308

[22] Filed: Jan. 3, 1996

[51] Int. Cl.$^6$ ............................................. B03B 7/00
[52] U.S. Cl. ................... 209/44; 209/458; 209/497; 209/506
[58] Field of Search ................... 209/13, 44, 458, 209/477, 483, 488, 497, 498, 499, 506

[56] References Cited

U.S. PATENT DOCUMENTS

| | | | |
|---|---|---|---|
| 671,973 | 4/1901 | Moberry | 209/458 X |
| 828,963 | 8/1906 | Peters et al. | 209/458 |
| 1,588,102 | 6/1926 | Goody | 209/458 |
| 2,923,410 | 2/1960 | Tschmelitsch | 209/458 |
| 3,941,690 | 3/1976 | Powers et al. | 209/443 |
| 4,289,241 | 9/1981 | Litrap | 209/447 X |
| 4,290,527 | 9/1981 | Wright | 209/44 X |
| 4,319,985 | 3/1982 | Hibbard | 209/458 X |
| 4,375,491 | 3/1983 | Honig | 428/167 |
| 4,592,833 | 6/1986 | Perdue | 209/44 |
| 4,676,891 | 6/1987 | Braa et al. | 209/458 |

FOREIGN PATENT DOCUMENTS

| | | | |
|---|---|---|---|
| 1440545 | 11/1988 | U.S.S.R. | 209/458 |
| 2056528 | 3/1981 | United Kingdom | 209/458 |

OTHER PUBLICATIONS

Kellyco Brochure Ad For Sluices.
Magazine Ad For Swedish Gold Paw and Sluice.
Magazine Ad For Le'Trap Gold Paw and Sluice.

*Primary Examiner*—William E. Terrell
*Assistant Examiner*—Tuan N. Nguyen

[57] ABSTRACT

A small sluice for final separation of gold from all other materials commonly found in deposits of gravel, sand, etc. including a bottom panel (14) with a plurality of grooves (16), two substantially vertical sidewalls (15), a flared entrance end (13) and device for closing (18) the flared entrance end (13). This sluice is suitable for many uses including the cleanup of concentrates from panning and sluicing operations and for prospecting sampling.

2 Claims, 2 Drawing Sheets

PORTABLE FINISHING SLUICE

BACKGROUND—FIELD OF INVENTION

This invention relates to portable devices for separating granular material with the use of a liquid medium, according to their relative specific gravities, especially those used for the final separation of gold and other precious material from the concentrates derived from gold panning and gold sluicing.

BACKGROUND-DESCRIPTION OF PRIOR ART

The object of panning for gold is to retrieve as much gold as possible in any given time period from granular materials such as gravel, sand or clay. The two most common portable gold recovery devices in use today are the gold pan and the gold sluice.

Gold panners typically use either or both a gold pan and a gold sluice to process native granular materials from which they recover a small amount of concentrates. These concentrates usually consist of less than five percent of gold, silver and platinum and more than ninety five percent of waste materials. The waste materials are mostly what is referred to as "black sand" which has high levels of the iron minerals magnetite and hematite.

Most gold panners do the final separation of gold from concentrates by using a smaller than standard gold pan. One standard size gold pan by inventor Litrap (U.S. Pat. No. 4,289,241-Sep. 15, 1981) was designed to permit final separation of gold from concentrates in the pan, but this wastes time and reduces the amount of gold that can be recovered in a given period of time.

The reason for using a smaller gold pan is that the gold panner is usually working with a small amount of concentrates which contain an even smaller amount of gold. Large pans create widely varying levels of turbulence which make it difficult to do final separation without losing gold. Smaller pans can be operated with a more narrow range of turbulence. Substantial skill and a lot of time is required to do the final separation in any pan even a small one without losing gold.

It is not difficult to recover large pieces of gold from a gold pan or even those small enough to require the use of a pair of tweezers to pick up. However, much gold is so small that it is referred to as "colors" or "flour gold". It is this gold that requires so much time, so much patience and so much skill to separate from the concentrates.

Some panners resort to the use of mercury to recover this fine gold. Not only is that practice expensive and very dangerous, but the panner then needs heat and acid to remove the mercury.

For the small volume or recreational gold panner, final separation of gold from concentrates is always a challenge. There is no quick, easy, safe and effective way to do final recovery. All prior art designed for final separation is both complicated and expensive to manufacture.

A standard size sluice can process materials faster than a standard size gold pan. Why couldn't a smaller sluice do final separation faster than a smaller pan? The answer lies in the examination of the functional parts of a sluice.

A sluice is simply a channeled container through which water and other materials can flow. Various riffles obstructions and cavities are placed in the sluice to capture heavier materials while allowing lighter materials to pass through and out of the sluice. Some sluices have only riffles across their inside bottom surfaces that are perpendicular to the flow of materials. Others may also utilize perforated metal, expanded metal, carpet or even open cell foam sheets among other things.

The purpose of the riffles and other materials is to disrupt the flow of materials and create less turbulent spots where heavier materials can drop out of the flow and remain there. When the panner stops processing raw materials this dropped material is recovered as the concentrates. It will consist of gold, silver, platinum, black sand and other waste materials.

There are five characteristics of current sluices that make them unsuitable for final separation of gold from concentrates.

First, the less turbulent or quiet spots created by riffles, expanded metal, foam, carpet, etc. can't distinguish between gold and lighter waste materials. If you wash only light waste materials through the sluice some of it will drop into the quiet spots and remain there. These concentrates have no value for the panner.

Second, the quiet spots fill immediately with lighter waste materials and they lose most of their effectiveness for trapping other materials. The theory is that heavier materials will displace the lighter materials yet this does not always happen.

If a quiet spot is filled with lighter materials some heavier materials can move over the surface of the lighter materials and not be trapped. This is especially true if the quiet spot gets filled with black sand which compacts quickly and is more difficult to dislodge and replace. It is not uncommon for the quiet areas of a sluice to fill up and fine gold to travel through and out of the sluice without being caught. It is this fine gold that poses the biggest challenge to skill and equipment.

Third, most panners screen larger pieces of material out of their concentrates before final separation. Large pieces of gold are easy to see and recover and finer materials are easier to process if there are no large pieces mixed in. No one has built a sluice small enough to handle just fine materials, usually in small volumes. Large sluices, like large pans are unsuitable for separating small quantities of fine materials. No one has built a sluice small enough to be carried in a pocket for prospecting sampling.

Fourth, they have too wide a variance in levels of turbulence from place to place and from time to time. It might be so high at some times and in some parts of the sluice that even gold is moved along and perhaps out of the sluice. When large rocks come to rest in the sluice they create spots of very high turbulence as water flows around them. In other places and at other times it might be so low that even lighter waste materials remain at rest and are not moved out of the sluice. Because of its sloping side walls even Litrap's gold pan mentioned above has variations in turbulence across its working face. The turbulence in current art forms cannot be controlled and consistent all the time and throughout the sluice.

Fifth, not all individual particles of granular materials are continuously subjected to a controlled level of turbulence. As particles move around in existing pans and sluices they are subjected to almost infinite variations in turbulence levels. They quite often become buried and stay buried for long periods of time and experience no turbulence at all. Then there is no separation taking place. At other times they are exposed to such strong turbulence that they are swept completely out of the pan or sluice.

Current art forms use riffles of varying heights or they use combinations of riffles, perforated plates, screens, mats, carpet, grooves, expanded metal, etc. to form quiet spots. With these designs it is not possible to expose all particles to a uniform, maximum level of turbulence regardless of their location. Hibbard in U.S. Pat. No. 4,319,985; Mar. 16, 1982 used a sluice as part of a larger, more complicated device. In it he used only a rubber mat with grooves of uniform size to catch the gold. However, the grooves were not designed to hold only gold. They were there "to trap gold and black sand particles".

There are dozens of prior artforms used as ore concentrators or ore classifiers. Most of them have used one or more sluices as part of a larger, more complicated device. All of these sluices were designed to create quiet areas to capture a range of heavy materials. Except for Hibbard they used multiple riffle sizes and designs or multiple components to create the quiet areas. None of these sluices have the capability to expose all particles of material passing through them to a uniform, maximum level of turbulence regardless of their location within the sluice.

Gold has a specific gravity of 19.3, Platinum is 19 and silver is about 11. Magnetite and hematite are ores of iron. They are the heaviest waste materials in native granular materials and have a specific gravity of 5.2 or about ¼ to ½ that of the precious metals. Quartz and feldspar are some of the most plentiful waste materials and have a specific gravity of 2.6 or about ¼ to ⅛ that of the precious metals.

There is a very wide gap between the specific gravities of the precious metals and those of all other materials found in native granular materials. It is this gap between specific gravities that offers the opportunity for fast, easy, clean separation of precious metals from the rest of the concentrates from gold panning and gold sluicing.

If a sluice had means for applying a consistent level of resistance to the movement of all particles that would be a great benefit to separation. If the sluice also had a means for applying a consistent and continuous level of turbulent force to all particles that would also be a great benefit. And if that sluice could balance the resistance to movement with the turbulence so that all particles except those with very high specific gravities could be moved, then clean separation could occur quickly and easily.

To date, no one has recognized the potential of using a sluice for final separation. Therefore, no one has examined the problems involved and tried to solve them.

OBJECTS AND ADVANTAGES a) to design a sluice that can effectively distinguish between heavier materials such as gold, silver and platinum and all other lighter material by means of their specific gravities and accomplish final separation quickly and easily.

b) to design a sluice small enough to be effective with small granular materials that can pass through a screen with approximately one eighth inch openings or smaller.

c) to design a sluice that processes fine materials for final separation of concentrates but that is not adversely effected by large pieces of material passing through it.

d) to design a sluice that has no quiet spots.

e) to design a sluice that maintains a consistent, minimum level of turbulence around all particles in it.

f) to design a sluice that is small enough to be carried in a prospectors pocket for random sampling of potential gold bearing materials or areas.

g) to design a sluice that will accurately test for the presence of fine gold in granular materials in a matter of seconds, rather than minutes or hours.

h) to design a sluice that is of simple construction and very economical to produce so that it costs about the same as a molded plastic gold pan.

Further objects and advantages of my sluice will become apparent from a consideration of the drawings and ensuing description.

DRAWING FIGURES

REFERENCE NUMERALS IN DRAWING

11—sluice
12—working end
13—flared end
14—bottom panel
15—vertical wall
16—groove
17—eddy current
18—means for closing

SUMMARY

The portable finishing sluice is a simple and inexpensive channeling device that controls and directs the flow of materials over a bottom structure which selectively grabs and holds the heavier materials such as gold and platinum while allowing all lighter unwanted materials to pass through and out of the device. Although it can be made and assembled from a few easily fabricated parts, it can also be made in one plastic molding operation.

Two substantially vertical sidewalls control the flow of materials over the structure of the bottom panel and also flare widely at the entrance end to capture more volume of water in-order-to increase the velocity through the working part of the sluice. The special design of the structure of the bottom panel guarantees that all particles are constantly subjected to a controlled maximum level of turbulence so that only gold and platinum are heavy enough to be held in place by the bottom structure.

No prior art has examined the problems involved in nor the potential benefits of using a sluice for final separation of gold from concentrates derived from gold panning and gold sluicing.

Figure 1:
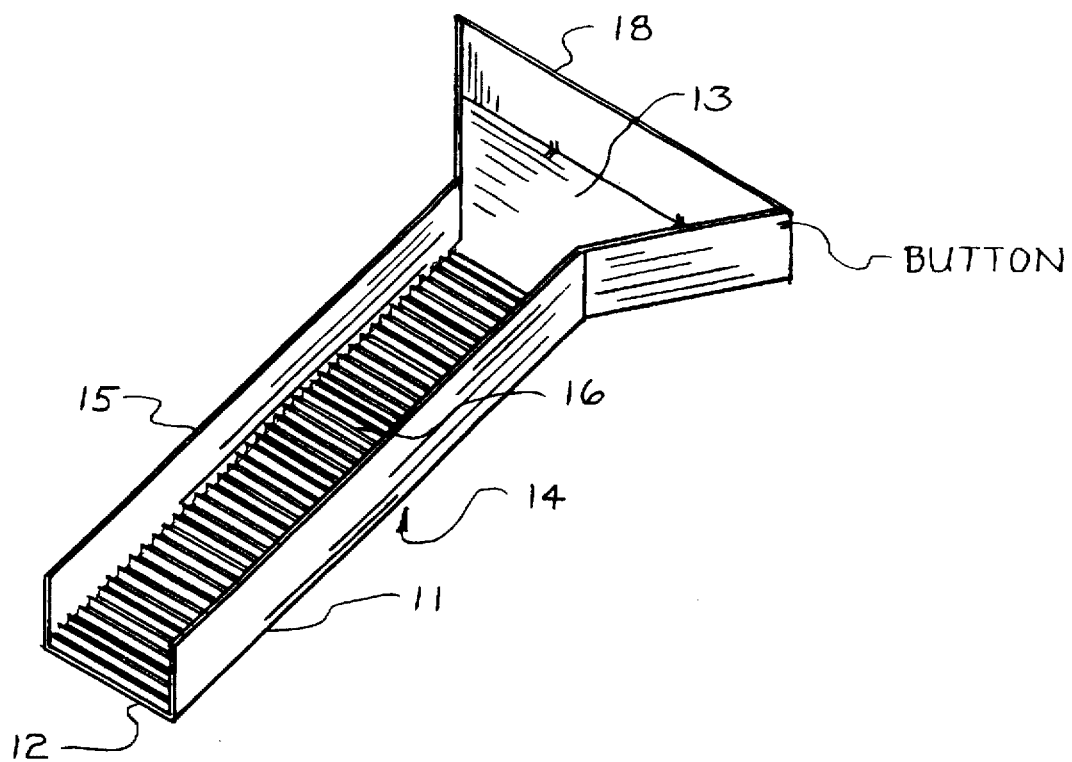
FIG. 1 is an overall view of the preferred embodiment.
Figure 2:
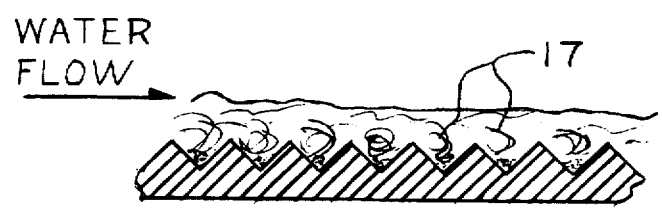
FIG. 2 is a cutout showing grooves and eddy current.
Figure 4:
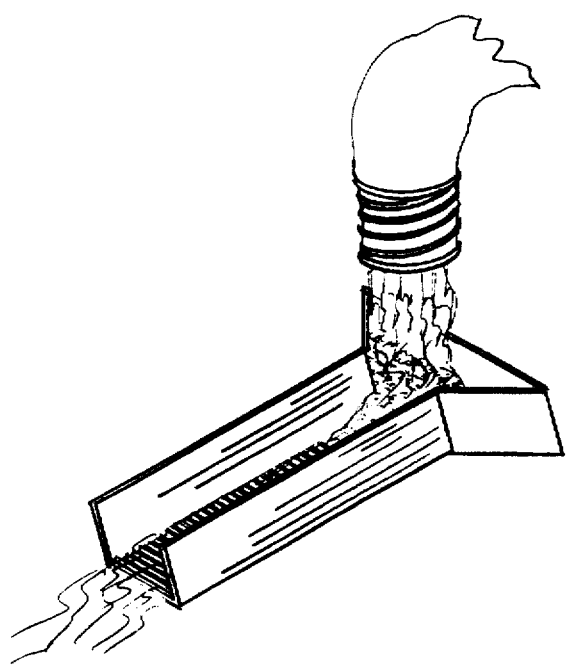
FIG. 4 is the sluice using a garden hose for current.

DESCRIPTION—FIGS. 1, 2 and 4

A sluice 11 is basically a watertight channel or trough through which water and granular materials can flow. It can be made of metal, plastic, wood or any other rigid material capable of being joined and withstanding the moisture and abuse encountered in gold panning activities.

Sluice 11 has only three components as seen in FIG. 1. A bottom panel 14 that is substantially flat has a working end 12 that is substantially straight and a flared end 13 at the entrance to sluice 11. It has the overall shape of the capital Y in the alphabet. A vertical wall 15 that is substantially vertical on each side of panel 14 serves to contain and direct the flow of materials along and over panel 14. Flowing water creates an eddy current 17 in a groove 16 of panel 14.

The bottom leg of the Y is working end 12 and the top of the Y is the entrance or flared end 13 as seen in FIG. 1. In field testing working end 12 performed best with a width of about 1½ to 2 inches and a length of 12 inches or less. Vertical walls 15 were ½ to 1 inch tall.

Vertical walls 15 should flare in a straight line toward the entrance end of the sluice and away from the centerline of panel 14 at no greater than a 45 degree angle. Flared end 13 should be 2 to 3 times the width of working end 12 of panel 14. The flare catches more water and creates higher velocity through working end 12 than is available in the stream itself.

Working end 12 of panel 14 should be of a uniform width and should contain a plurality of grooves 16 that are perpendicular to the flow of materials, side walls 15 and the centerline of panel 14. Grooves 16 should begin where flared end 13 meets working end 12. They should continue to the exit end of the sluice and each should extend from one side wall 15 to the other.

Start with one flat piece of material in the shape of a capital Y as seen in FIG. 2. Grooves 16 in working end 12 should be cut down to extend beneath the surface of panel 14. Use a cutting tool suitable to the materials you choose for sluice 11.

Grooves 16 can have a variety of shapes, including V, U or square. In field testing a groove 16 depth of 1/16" to 1/8" seemed to work best for fine materials although greater depths could be used for more coarse materials and larger versions of sluice 11. A groove 16 width of approximately two times the groove 16 depth worked best in field testing.

Groove 16 width is the perpendicular distance across the top or open side of groove 16. Groove 16 depth is the vertical distance from the bottom of groove 16 to the top or open end at the surface of panel 14. In field testing the V shaped groove 16 with a substantially zero bottom radius worked best because each particle of gold could contact both sides of groove 16 when at rest.

Attach small strips to each side of panel 14 to form vertical side walls 15 as seen in FIG. 11. Nails, screws, glue, etc. may be used for fastening. The only purpose of vertical side wall 15 is to contain and direct the stream of materials along and over panel 14.

For use at home with a garden hose you should fabricate a means for closing 18 that can be attached to the open end of flared end 13 which will not allow water to pass out of that end. Water from a garden hose or other source which is dropped into flared end 13 should pass through working end 12 and out of sluice 11 as seen in FIG. 4.

OPERATION—FIGS. 3 AND 4

Figure 3:
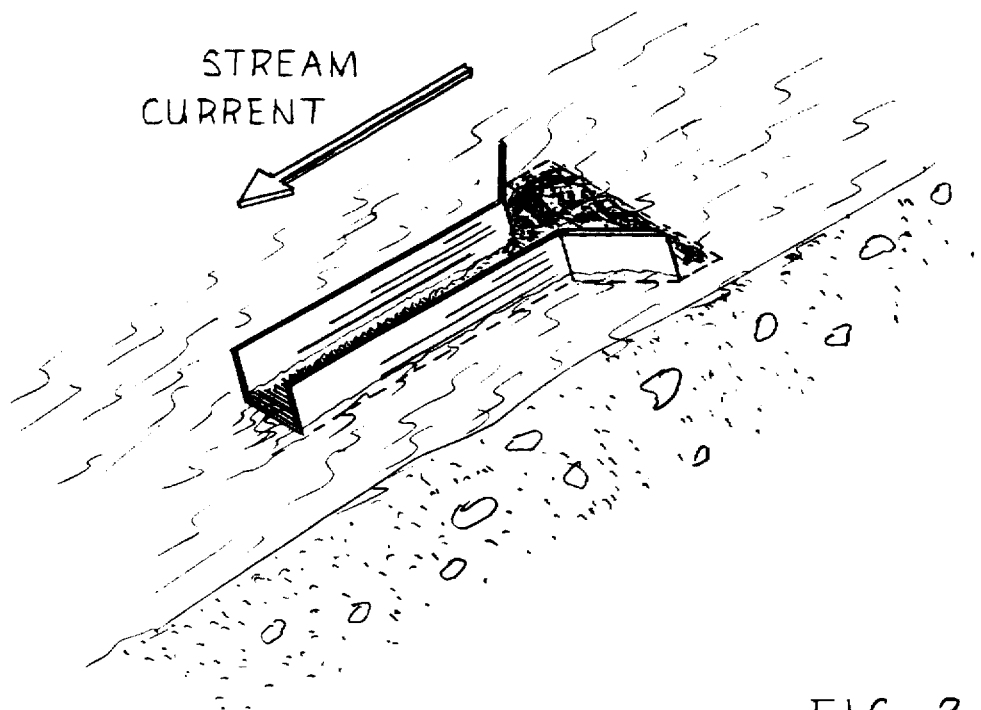
FIG. 3 is the sluice in a stream.

Sluice 11 can be placed in a stream in the field. Water should be flowing ½ to ¾ inch deep into flared end 13 of sluice 11, through working end 12 of sluice 11 and out as seen in FIG. 3.

Sluice 11 should be approximately level when checked from side to side along a line that is perpendicular to the centerline of panel 14 of sluice 11. Sluice 11 should not be level when measured from end to end. The bottom or exit end of sluice 11 at working end 12 should be lower than the entrance or flared end 13 of sluice 11 by about one inch per lineal foot of the length of sluice 11 as measured along the centerline of bottom panel 14.

The first is to screen the raw materials through approximately a one-eighth inch opening screen or smaller. In most situations a one sixteenth inch screen will be appropriate. Place screened materials on the flat bottom surface of flared end 13 of sluice 11 as seen in FIG. 3. Flowing water will immediately begin moving individual pieces down sloping bottom panel 14 and into working end 12 where they will drop into grooves 16 that are perpendicular to their line of travel.

The water flowing down through working end 12 has sufficient force to move particles through and out of sluice 11. This flowing water also produces turbulence or eddy currents 17 in grooves 16 as seen in FIG. 2, that is consistent from groove 16 to groove 16 and of approximately equal strength from one end of groove 16 to the other. This consistency is created by the uniformity of grooves' 16 size and shape and by the fact that they are aligned perpendicular to the flow of water in sluice 11.

As each grain of material drops into groove 16 the turbulence created by eddy current 17 in groove 16 is strong enough to lift it back out again. It will fall into successive grooves 16 until it finally falls out the bottom end of working end 12. Only gold, platinum and silver have high enough specific gravities that the turbulence in groove 16 cannot lift them out again.

When the granular materials start moving from flared end 13 into working end 12 all grooves 16 will appear to be full of dancing particles. In reality you are seeing particles fall into and then out of successive grooves 16 as they move toward the exit of the sluice. In a matter of seconds the dancing particles will decrease in quantity then disappear altogether.

When you look down into sluice 11 all you will see are the small pieces of gold. They usually remain in the first groove 16 where they touch bottom. With a specific gravity of 4 to 8 times that of the heaviest waste materials, they cannot be lifted out of groove 16 by the maximum turbulence they are exposed to there.

The V bottomed grooves 16 with substantially zero radius as seen in FIG. 2 grip each gold particle from both sides. The gold particles will not rest on top of each other but will spread out along groove 16 until each is gripped by two converging sides of the V bottom. No matter how much material you run through sluice 11, a piece of gold trapped in groove 16 will remain in groove 16.

The design of groove 16 in working end 12 ensures a top limit to the maximum turbulence encountered in groove 16. That maximum limit is just below the turbulence level needed to lift gold, platinum and silver, but high enough to lift all waste materials and carry them out of sluice 11.

The design of groove 16 ensures that no matter where a particle is in working end 12 of sluice 11 it will be exposed to that designed maximum level of turbulence. This balance and total control of turbulence allows total, clean separation of gold from concentrates in one operation and in seconds, rather than hours.

By using grooves 16 that extend below the surface plane of panel 14 rather than riffles, etc. that protrude up into the stream of flowing water, larger particles of waste material cannot be stopped from flowing through and out of sluice 11. This characteristic is what also makes sluice 11 an ideal prospecting tool where prescreening is not practical.

Suice 11 is small enough to be carried in a pocket into any remote area. It can be placed into any body of moving water. Samples of granular materials can be taken from any location and placed in flared end 13 of sluice 11.

Flowing water will quickly wash out all waste materials, even large pieces. If there is even one tiny piece of gold in the sample it will be visible in the first few grooves 16. Since most gold recovered is fine gold, sluice 11, with no other equipment needed, allows the prospector to perform many accurate samplings with only seconds required for each sample.

Sluice 11 has a means for closing 18 the flared end 13 as seen in FIG. 1. With a garden hose, a can or any other container of water, gold separation can still be done quickly where there is no stream available.

Simply set up sluice 11 with the needed slope from end to end. Put materials in flared end 13 and pour water over the material as seen in FIG. 4. Since the water can't pour out flared end 13 it will flow through working end 12 of sluice 11 and out. Sluice 11 will work as well as if it was in a stream.

CONCLUSION, RAMIFICATIONS AND SCOPE

Accordingly, the reader will see that the device of the present invention enables a panner to make a rapid and complete separation of gold from concentrates derived from gold panning and gold sluicing. It can be achieved without the need for expensive equipment or dangerous materials such as mercury.

The wide disparity between the specific gravity of gold at 19.3 and the specific gravity of the heaviest waste material in concentrates, magnetite at 5.2, creates the opportunity for rapid and complete separation. The margin for error is so broad that the risk of losing gold is minimal. It is easy to visualize that a level of turbulence that is more than strong enough to lift magnetite out of a specially designed groove could also be too weak to lift gold out of that same groove.

Prior art forms were designed to create quiet areas of little or no turbulence where light or heavy particles could be shielded and held within the sluice. The device of the present invention is designed to ensure that there are no quiet areas and that every particle in the sluice is exposed to the maximum level of turbulence and all but gold is washed out of the sluice.

By using grooves that extend below the stream of water and materials flowing through the sluice rather than riffles that protrude up into the stream we accomplish two important objectives. One, the stream can flow at a consistent rate through the sluice. Second, there is nothing to catch larger particles of waste materials and prevent them from washing out of the sluice.

A groove that is perpendicular to the flow of materials creates consistent turbulence all across the sluice. This groove also allows a consistent flow of materials throughout the sluice.

By controlling the groove design and dimensions we can create a sluice that effectively separates gold from concentrates when working with granular particles that fall within a relatively narrow range of physical sizes. Since most gold recovered in panning or sluicing operations will pass through a one eighth inch screen or less, one groove size is suitable for separating concentrates or for prospecting in the field.

Although the descriptions in the preceding writings contain some specificities, these should not be construed as limiting the scope of the invention but as merely providing illustrations of some of the presently preferred embodiments of the invention. For example: the grooves can have many geometrical shapes and dimensions; the grooves can be contiguous or be separated by flat areas of equal or varying widths; the width of the working end can vary; the height of the vertical walls can vary; the flared end can be wider or narrower; the sluice can be of uniform width from end-to-end without any flaring at the entrance; the means for closing the flared end can be attached, hinged or separate; many materials or colors can be used; a special groove can be added to hold mercury or a mercury coated plate; etc.

This sluice can be used individually or one or more of them with one or more groove sizes or designs can be used as part of a more complicated device or system.

Thus the scope of the invention should be determined by the appended claims and their legal equivalents, rather than just by the examples given.

What I claim and desire to secure by Letters of Patent of the United States is:

1. A sluice for final separation of gold from other waste materials found in natural granular deposits of slurry, the sluice comprising:

a. a bottom panel with a flared, entrance end for receiving the granular deposits and a working, exit end for discharging waste materials from the granular deposits;

b. a pair of substantially vertical side walls attaching to each side of the bottom panel in a watertight joining such that liquid and granular materials are contained and forced to flow over the full length of the bottom panel; and c. a plurality of specially shaped grooves formed into the surface of the bottom panel to catch and hold gold particles while allowing the waste materials to be washed out of the sluice; said grooves insure that all particles are subjected to the moving force of the stream of slurry at all times.

2. The sluice of claim 1 further including a means for completely closing the flared, entrance end of the sluice so that the granular deposits are fed from above the sluice and no liquid nor granular materials can escape out of said entrance end.

* * * * *